UNITED STATES PATENT OFFICE.

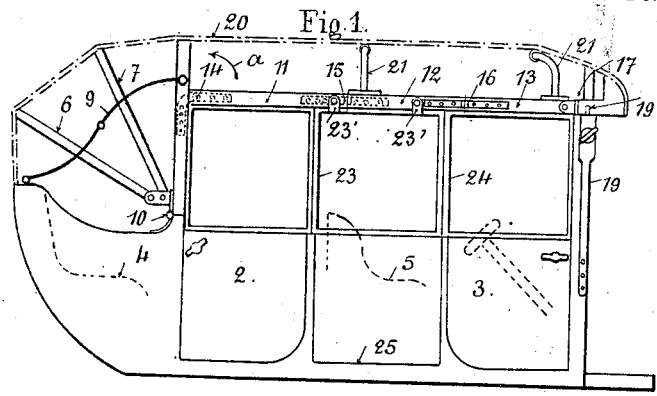

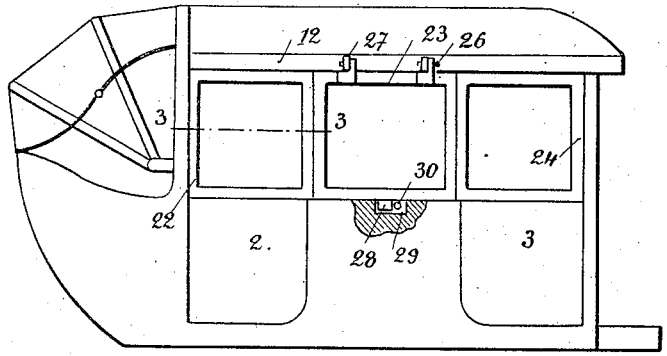
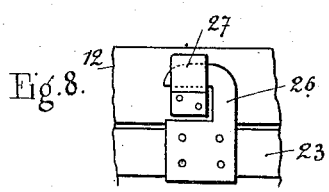
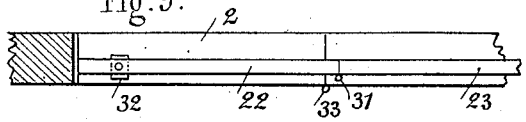
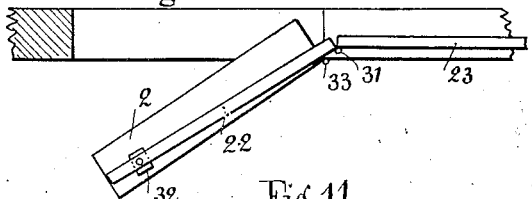
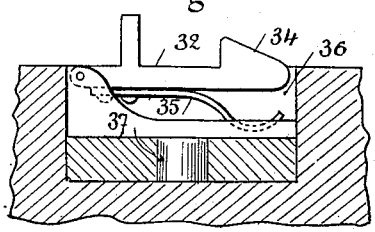

HONORÉ MOZEYKO, OF LEVALLOIS, FRANCE.

FOLDING ROOF AND REMOVABLE PANELS FOR MOTOR AND OTHER VEHICLE BODIES.

1,198,865.  Specification of Letters Patent.  Patented Sept. 19, 1916.

Application filed November 15, 1913. Serial No. 801,202.

*To all whom it may concern:*

Be it known that I, HONORÉ MOZEYKO, a citizen of the French Republic, and residing at No. 17 Rue de Cormeilles, in Levallois, Seine, France, coachbuilder, have invented certain new and useful Improvements in and Relating to Folding Roofs and Removable Panels for Motor and other Vehicle Bodies, of which the following is a complete specification.

The invention relates to a folding roof combined with a device for fitting glazed sides applicable to motor or other vehicles.

The invention is illustrated applied to the body of a motor vehicle which, owing to the provision of the devices hereinafter described, may be termed a torpedo car driven from the interior.

A characteristic of the invention resides in the fact that the glazed frames forming the sides inclosing the body are jointed on each side relatively to each other in such manner that they are able to open with the doors, and also, after having been folded one upon the other, they are able to enter housings or wells provided for this purpose in the interior of the vehicle body.

Another characteristic of the invention resides in the fact that the fittings of the roof proper are arranged in such manner that when the glazed frames have been removed they can be folded upon themselves horizontally and brought against the hood, which can itself be turned back in the known manner, carrying with it the folded roof fittings. The vehicle body is then completely uncovered.

The invention is illustrated by way of example in the accompanying drawings; in which—

Figure 1 is an elevation of a carriage body provided with the device in accordance with the invention, the hood being raised, the roof opened out, and the glazed frames arranged in position for use. Fig. 2 is a plan view corresponding to Fig. 1. Fig. 3 is a diagrammatic view showing the method of folding the glazed frames one upon the other. Fig. 4 shows them completely folded and ready to be housed in the wells. Fig. 5 is a diagrammatical view showing the method of folding the roof fittings. Fig. 6 is an elevation of the carriage body, the hood and the roof fittings being completely folded and turned back. Fig. 7 is a side elevation of a modification. Fig. 8 illustrates a detail of the suspension hooks shown in Fig. 7. Figs. 9 and 10 are sections to a larger scale on the line 3—3 of Fig. 7, showing the glasses or windows in two different positions. Fig. 11 illustrates a modification of the device for retaining the glazed frames.

The carriage body 1 comprises on each side two doors 2 and 3 giving access to seats 4 and 5 respectively. The hood which is composed of the hoops 6, 7 and 8 with supporting compass legs 9 pivots at 10 upon the body 1. Three longitudinal members 11, 12 and 13 arranged end to end on each side of the body constitute the roof fittings. The longitudinal members 11 are jointed at 14 relatively to the hoops 8, in such manner as to be capable of displacement in the direction indicated by the arrow $a$ in Fig. 1. The longitudinal members 12 are jointed at 15 relatively to the longitudinal members 11, in such manner as to move in the direction indicated by the arrow $b$ Fig. 2. The longitudinal members 13 are jointed at 16 relatively to the longitudinal members 12, in such manner as to move relatively to these longitudinal members 12, in the direction indicated by the arrow $c$. In addition the longitudinal members 13 are jointed at 17 relatively to a cross member 18 which limits the roof in the front in such manner that these members 13 are capable of displacement in the direction indicated by the arrow $d$.

The roof fittings are connected at the rear with the hoop 8 and rest at the front upon the uprights 19 of the wind screen, by means of the pins 19' entering corresponding recesses formed in the cross member 18.

As will be understood the covering 20 of leather or canvas supported by cross members, constituted by telescopic tubes 21 carried by the longitudinal members 12 and 13, covers the whole, except for the doors 2 and 3 and the space left vacant at the sides between the members 11, 12 and 13, and the body 1, and intended to be closed by the glazed frames.

The glazed frames 22, 23 and 24 are hinged one to the other in such manner that when they have been arranged in place as shown in Fig. 1 the doors 2 and 3 can be opened carrying with them the corresponding glazed frames which are supported upon the doors by means of projections appropriately arranged at the upper part of the doors. The central frame 23 is also held in place below, owing to the fact that it fits into a groove in the body 1 and above by means of pivoting lugs 23′ carried by the longitudinal member 12. With the parts thus arranged if it be desired to remove the three frames 22, 23 and 24 it is only necessary to press back the stops 23′ to withdraw the whole, and then to fold it as indicated in Figs. 3 and 4. The frames thus folded can then be arranged in the housings or wells 25 formed between the seat 5 and the sides of the body 1 (Fig. 2). Fig. 6 shows the glazed frames thus arranged. Now if it be desired to uncover the body, it is only necessary after having released the cross member 18 from the pins 19′ to press this cross member rearward after the longitudinal members 12 and 13 have been caused to work suitably upon their respective hinges. Fig. 5 shows in firm lines the position occupied by the cross member 18 and the longitudinal members 12 and 13 at the beginning of the folding operation while the fittings completely folded back with the hood still raised are represented in broken lines. When the roof fittings have thus been folded horizontally they are caused to pivot vertically in the direction indicated by the arrow *a* in Fig. 1 upon the hoop 8; then the compass legs 9 being folded, the roof of the hood, falls automatically toward the rear, into the position shown in Fig. 6. The body is then completely uncovered. The manner in which the whole including the glazed frames is replaced in position will readily be understood as it is only necessary to operate inversely, that is to say, to open the compass legs 9, depress the longitudinal members 11, open out the longitudinal members 12 and 13, and the cross member 18, and finally to replace the glazed frames.

As a secondary point it should be noted that the rigidity and maintenance in the position of the whole constituted by the folded roof are insured as regards the joints 15 and 16 by knob releasing catches of any known type upon which it is necessary to press, to enable the joints to work, while as regards the point of support for the cross member 18 upon the uprights 19 of the wind screen, the same purpose is served by pressure screws or catches carried by the cross member 18 which are engaged with the pins 19′ when the roof fittings are extended.

As shown more particularly in Figs. 7 to 10, the middle glazed frame 23 has at its upper part fixing lugs or hooks 26 adapted to enter staples 27 provided upon the corresponding longitudinal member 12. At the lower part of this frame there is arranged a tappet 28 adapted to be housed in a recess 29 in the body in which a stop 30 (provided with an operating device not shown) is able to work. The width of the recess 29 is substantially equal to that of the tappet 28 in such a manner as to maintain the frame 23 in position with the maximum rigidity.

Each of the jointed frames 22—24 connected with the middle frame 23 by the hinges 31 fits, in the position for use represented in Figs. 7 to 10, in a guide 32 mounted upon the corresponding door 2 and 3 in such manner that it is able to pivot. The frame is merely arranged in this guide in such manner that it is able to slide to permit of the play of the hinges of the door and of the glass notwithstanding the fact that these hinges are not arranged along a common axis.

When the door 2 is opened for example as shown in Fig. 10, this door will work upon its hinges 33 in the usual manner and will merely carry with it the corresponding frame 22 by means of the guide 32 and this frame will work around its hinges 31, so that in this case the guide 32 forms merely a displacing member in presenting the frame 22 in any position relatively to the door 2, during the movement of the latter. This relative play is rendered possible by the twofold peculiarity that the guide 32 is able to pivot upon the door 2 and the frame 22 is able to slide in this guide.

In the construction illustrated in Figs. 1 to 4 and in Figs. 7 to 10 for the fitting of the glazed frames it is first of all necessary to unfold the panels 22—24, and simultaneously introduce the tappet 28 into the recess 29 and each of the panels 22 and 24 into its guide 32. In order to avoid the difficulty inherent in this operation it is possible as shown in Fig. 11 to arrange upon the upper part of each of the doors 2 and 3 a latch 34 with spring 35 capable of moving aside in a recess 36 in the door, the whole being mounted upon a pivot 37, in such manner that it is able to assume any desired position upon the door in order to afford complete independence for opening and shutting the door and the frame respectively. Thus a spring bolt adapted to be operated from the outside might be provided for automatically maintaining the frame in position when opened out. Similarly the hooks 26 can be hinged upon the frame in such manner as to permit of turning them back when the frame as a whole is housed in the wells. The fixing of the middle glass or window 23 in position for use represented in Figs. 1 and 7 can also be effected in any desired manner.

It will of course be understood that the materials employed for the construction of the folding roof may vary; the longitudinal members 11, 12 and 13, and the cross member 18, although preferably of wood may be formed of light profiled irons. Finally the respective dimensions or the dimensions as a whole of the members of which the folding roof and the glazed frames are composed may vary in accordance with the dimensions of the vehicle bodies to which they are to be fitted.

What I claim is:

1. The combination of a vehicle body having a folding top and provided with a hinged door, the door and the portion of the body at one side of the door terminating short of the top, and glazed frames hinged together and detachably secured in the space between the top and the body and door, the glazed frame above the door having sliding engagement with the door to permit it to swing with said door.

2. The combination of a vehicle body having a folding top and provided with a hinged door, the door and the portion of the body at one side of the door terminating short of the top, and glazed frames hinged together fitting in the space between the top and the body and door, and means for detachably securing the glazed frame between the body and top to the said body and top, the glazed frame above the door having sliding engagement with the door to permit it to swing with said door.

3. The combination of a vehicle body having a folding top and provided with hinged doors spaced apart, the doors and the portion of the body between the doors terminating short of the top, three glazed frames hinged together and fitting in the space between the top and the body and doors, and means for detachably securing the central glazed frame to the top and body.

4. The combination of a vehicle body having a folding top, a hinged door, and a housing on its inner face, the door and the portion of the body at one side of the door terminating short of the top, and glazed frames hinged together to fold one upon the other and detachably secured in the space between the top and the body and door, the glazed frame above the door having a sliding engagement with the door to permit it to swing with said door, the glazed frames when removed and folded being adapted to be placed in the housing of the body.

5. The combination of a vehicle body having a folding top and provided with a hinged door, the door and the portion of the body at one side of the door terminating short of the top, glazed frames hinged together and fitting in the space between the top and the body and door, means for detachably securing one of the glazed frames to the body and top, and a pivoted and spring pressed latch carried by a pivoted support mounted upon the upper edge of the door.

6. The combination of a vehicle body having a folding top and provided with a hinged door, the door and the portion of the body at one side of the door terminating short of the top, glazed frames hinged together and fitting in the space between the top and the body and door, the glazed frame above the door having a sliding engagement with the door to permit it to swing with said door, hooks and eyes for securing one of the frames to the top, a lug on the lower portion of the said frame and entering an elongated recess in the body, and means for holding the lug from movement in the recess.

7. The combination with a vehicle body having a folding hood at its rear portion, of a folding roof for the remaining portion of the body, said roof comprising rear members hinged to the bows of the hood to fold upwardly and rearwardly, intermediate members hinged to the rear members to fold inwardly, front members hinged to the intermediate members to fold outwardly, a cross member to which the forward ends of the front members are hinged, and adjustable cross members secured to the side members.

8. The combination with a vehicle body having a folding hood at its rear portion, and uprights at its front portion, of a folding roof for the remaining portion of the body, said roof comprising three members at opposite sides, the members at each side being hinged together, the rear end members being hinged to the bows of the hood and the front end members to a cross bar adapted to rest upon the said uprights, telescopic cross members secured to the side members, and a covering.

9. In a device of the character described, the combination with an automobile body provided with doors, of a foldable canopy for said automobile body and a pair of foldable side frames, means for removably connecting said frames to said automobile body, and means for pivotally and slidably connecting certain of said frames to the doors of said automobile body, whereby the last mentioned frames will move pivotally with the doors of the automobile body.

In testimony whereof I have hereunto placed my hand at Paris, France, this twenty-sixth day of August, 1913.

HONORÉ MOZEYKO.

In the presence of two witnesses—
HANSON C. COXE,
HENRY SCHWARTZ.